(12) United States Patent
Amdahl et al.

(10) Patent No.: US 7,697,427 B2
(45) Date of Patent: *Apr. 13, 2010

(54) METHOD AND SYSTEM FOR SCALING NETWORK TRAFFIC MANAGERS

(75) Inventors: Carlton G. Amdahl, Fremont, CA (US); Robert George Gilde, Issaquah, WA (US); David D. Schmitt, Seattle, WA (US); Paul Szabo, Seattle, WA (US); Richard R. Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 584 days.

This patent is subject to a terminal disclaimer.

(21) Appl. No.: 11/469,843

(22) Filed: Sep. 1, 2006

(65) Prior Publication Data

US 2006/0291388 A1 Dec. 28, 2006

Related U.S. Application Data

(63) Continuation of application No. 10/119,433, filed on Apr. 9, 2002, now Pat. No. 7,102,996.

(60) Provisional application No. 60/293,466, filed on May 24, 2001.

(51) Int. Cl.
*H04J 1/16* (2006.01)
*H04J 3/14* (2006.01)

(52) U.S. Cl. ........................ 370/230; 370/401

(58) Field of Classification Search .................. None
See application file for complete search history.

(56) References Cited

U.S. PATENT DOCUMENTS 6,157,950 A  12/2000  Krishnan
6,182,146 B1  1/2001  Graham-Cumming, Jr.
6,330,602 B1  12/2001  Law et al.
6,742,045 B1  5/2004  Albert et al.

(Continued)

OTHER PUBLICATIONS

Hewitt, John R. et al., "Securities Practice and Electronic Technology," Corporate Securities Series, (New York: Law Journal Seminars-Press) 1998, title page, bibliography page, pp. 4.29-4.30.

(Continued)

*Primary Examiner*—Ajit Patel
(74) *Attorney, Agent, or Firm*—Darby & Dary PC; Jamie L. Wiegand

(57) ABSTRACT

A system for distributing network traffic to multiple traffic management devices. A distributor receives each packet from a network and may act as a layer 2 switch, a router, or distribute the packet to one of a group of traffic management devices. The distributor may receive packets from servers that the traffic management devices are managing communications to. When distributing packets to traffic management devices, information such as source and destination addresses may be used to determine which traffic management device each packet should be sent to. The distributor causes packets that are part of a flow to be delivered to the same traffic management device. Many configurations are possible for connecting the distributor to the traffic management devices, including connecting each traffic management device to a physical or virtual port on the distributor, connecting the traffic management devices to the distributor using a virtual local area network, and connecting the traffic management devices to a layer 2 switch.

24 Claims, 13 Drawing Sheets

U.S. PATENT DOCUMENTS

| | | | |
|---|---|---|---|
| 6,775,235 | B2 | 8/2004 | Datta et al. |
| 6,788,692 | B1 | 9/2004 | Boundreau et al. |
| 6,792,461 | B1 | 9/2004 | Hericourt |
| 6,792,463 | B1 | 9/2004 | Lamberton et al. |
| 7,065,569 | B2 * | 6/2006 | Teraslinna ............... 709/223 |
| 7,088,710 | B1 * | 8/2006 | Johnson et al. ............ 370/357 |
| 2002/0114326 | A1 * | 8/2002 | Mahalingaiah ............ 370/389 |
| 2003/0021230 | A1 * | 1/2003 | Kuo et al. ................. 370/230 |
| 2003/0229809 | A1 | 12/2003 | Wexler et al. |
| 2004/0090919 | A1 * | 5/2004 | Callon et al. .............. 370/237 |
| 2005/0008017 | A1 | 1/2005 | Datta et al. |

OTHER PUBLICATIONS

Reardon, Marguerite, "A Smarter Session Switch: Arrowpoint's CS Session Switches Boast the Brains Needed for E-Commerce," Data Communications, Jan. 1999, title page, pp. 3, 5, 18.

U.S. Appl. No. 10/644,692, Official Communication mailed Oct. 30, 2007.

"Amendment to Carrier Sense Multiple Access with Collision Detection (CSMA/CD) Access Method and Physical Layer Specifications—Aggregation of Multiple Link Segments", IEEE Std. 802.3ad-2000, Mar. 30, 2000, pp. 1-173.

Thaler, D., et al., "Multipath Issues in Unicast and Multicast Next-Hop Selection", The Internet Society, Nov. 2000, pp. 1-9.

Hopps, C., "Analysis of an Equal-Cost Multi-Path Algorithm", The Internet Society, Nov. 2000, pp. 1-8.

Moy, J., "OSPF Version 2", The Internet Society, Apr. 1998, pp. 1-53.

U.S. Appl. No. 10/119,433, Official Communication mailed Mar. 30, 2006.

U.S. Appl. No. 10/644,692, Official Communication mailed May 18, 2007.

U.S. Appl. No. 10/659,011, Official Communication mailed May 27, 2009.

U.S. Appl. No. 10/659,011, Official Communication mailed Dec. 23, 2008.

U.S. Appl. No. 11/929,603, Official Communication mailed Aug. 25, 2009.

U.S. Appl. No. 10/659,011, Restriction Requirement mailed Sep. 19, 2008.

U.S. Appl. No. 10/644,692, Notice of Allowance mailed Feb. 26, 2008.

U.S. Appl. No. 10/119,433 Notice of Allowance mailed Jun. 14, 2006.

* cited by examiner

FIG. 9

|  | Destination Address | | | |
|---|---|---|---|---|
| Source Address | NAT xlate && Virtual | Virtual Address | NAT xlate | Unknown Address |
| NAT-able && Node Address | goto Dest | hash Src | goto Dest | hash Dest |
| NAT-able | goto Dest | hash Src | goto Dest | hash Dest |
| Node Address | goto Dest | hash Src | goto Dest | hash Dest |
| Unknown Address | hash Src | hash Src | hash Src | Route |

US 7,697,427 B2
METHOD AND SYSTEM FOR SCALING NETWORK TRAFFIC MANAGERS

CROSS-REFERENCE TO RELATED APPLICATIONS

This utility patent application is a continuation of allowed U.S. patent application Ser. No. 10/119,433 filed on Apr. 9, 2002, the benefit of which is claimed under 35 U.S.C. §120, which claims priority to U.S. Provisional Patent Application No. 60/293,466 filed on May 24, 2001, the benefit of the filing date of which is claimed under 35 U.S.C. §119(e), the disclosures of which are incorporated by reference in their entirety herein.

FIELD OF THE INVENTION

The present invention relates to computer network traffic, and in particular to distributing network traffic associated with traffic management devices.

BACKGROUND

The Internet's core bandwidth continues to double every year. Some of this additional bandwidth is consumed as more and more users access the Internet. Other additional bandwidth is consumed as existing users increase their use of the Internet. This increase of Internet use translates into an increase in traffic directed to and from World Wide Web (WWW) servers and other Internet servers.

Replacing a WWW server with a WWW server of twice the capacity is a costly undertaking. Adding additional WWW servers is less costly but generally requires a load-balancing mechanism to balance workload so that each virtual server performs work proportional to its capacity and the number of servers available to the traffic management device that is performing the load balancing.

Traffic across the Internet typically comes in the form of Transmission Control Protocol/Internet Protocol (TCP/IP) packets. TCP/IP has many layers for addressing packets. Managing TCP/IP packet traffic using lower layers typically requires less processing than managing packets using higher layers. As a result, lower layer traffic management may often be done in hardware with its attendant speed. Unfortunately, managing packet traffic based on lower layer information is typically not flexible enough for many applications using the Internet. For example, when a user is shopping for items on a WWW server and filling a "shopping cart," a traffic management device that sends one of packets from the user to one WWW server and another packet from the user to another WWW server may cause shopping cart information to be lost. As a result, a traffic management device may be required to store state information about connections and look at higher TCP/IP layers to maintain connections between servers and users.

This requirement for more sophisticated traffic management requires more processing. With a sufficient rate of requests, eventually a traffic management device may not be able to process traffic in a timely manner.

BRIEF DESCRIPTION OF THE DRAWINGS

FIG. 9 shows an exemplary table that may be used in distributing traffic;

DETAILED DESCRIPTION OF EMBODIMENTS

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

In the following description, first an illustrative operating environment in which the invention may be practiced is disclosed. Then, examples of two systems that distribute traffic are provided. Next, a method of processing inbound and outbound packets is given together with a table that may be used to determine an action to perform on a given packet, depending on attributes of the packet. Then, an example of how packets may be distributed in an exemplary system is provided. Finally, other exemplary systems for distributing traffic are described.

As used in this document, unless the context clearly indicates otherwise, a packet refers to an arbitrary or selectable amount of data which may be represented by a sequence of one or more bits. A packet may correspond to a data unit found in any layer of the OSI model, such as a segment, message, packet, datagram, frame, symbol stream, or stream, a combination of data units found in the OSI model, or a non OSI data unit.

Illustrative Operating Environment

Figure 1:
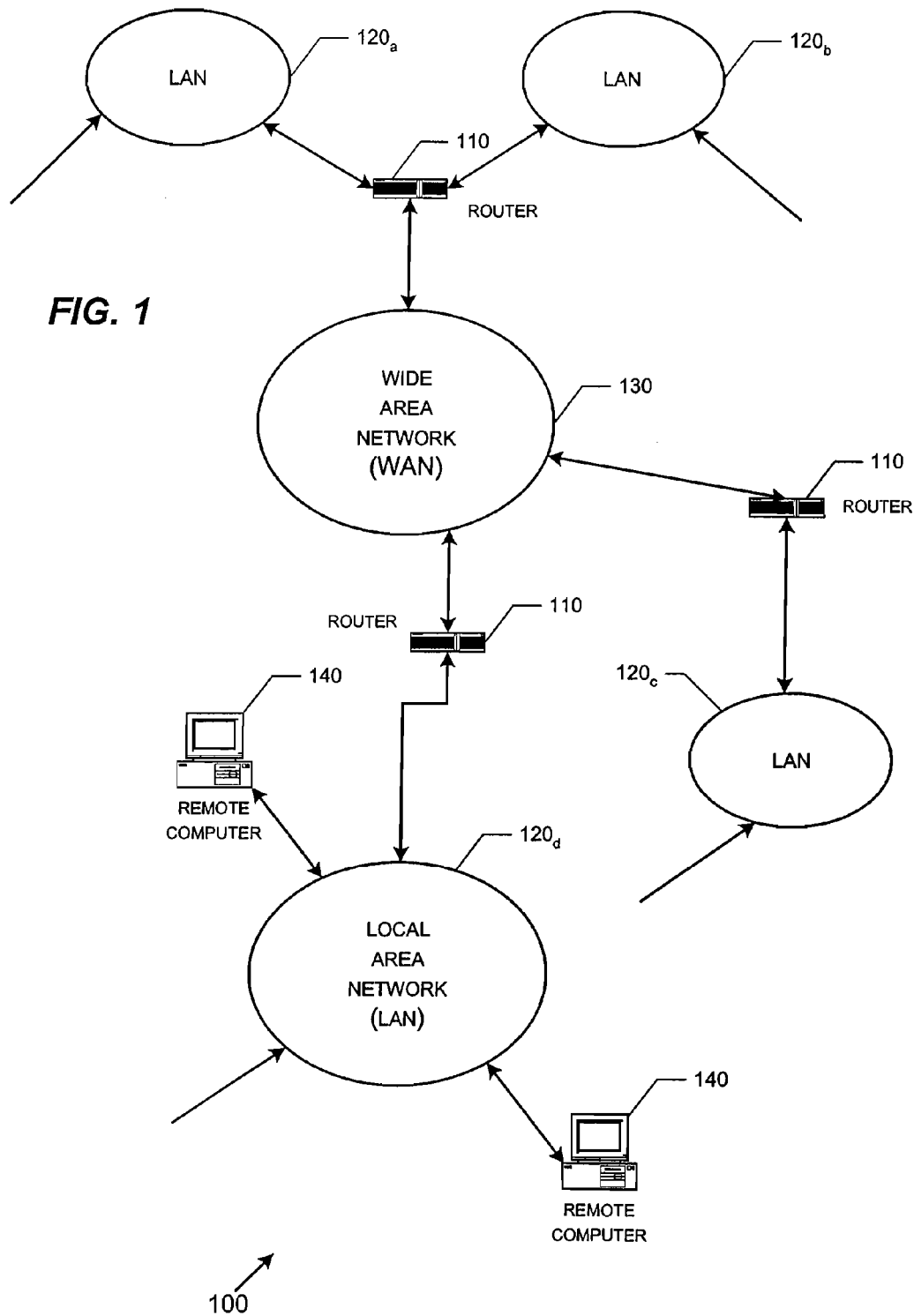
FIGS. 1-3 show components of an exemplary environment in which the invention may be practiced.
Figure 2:
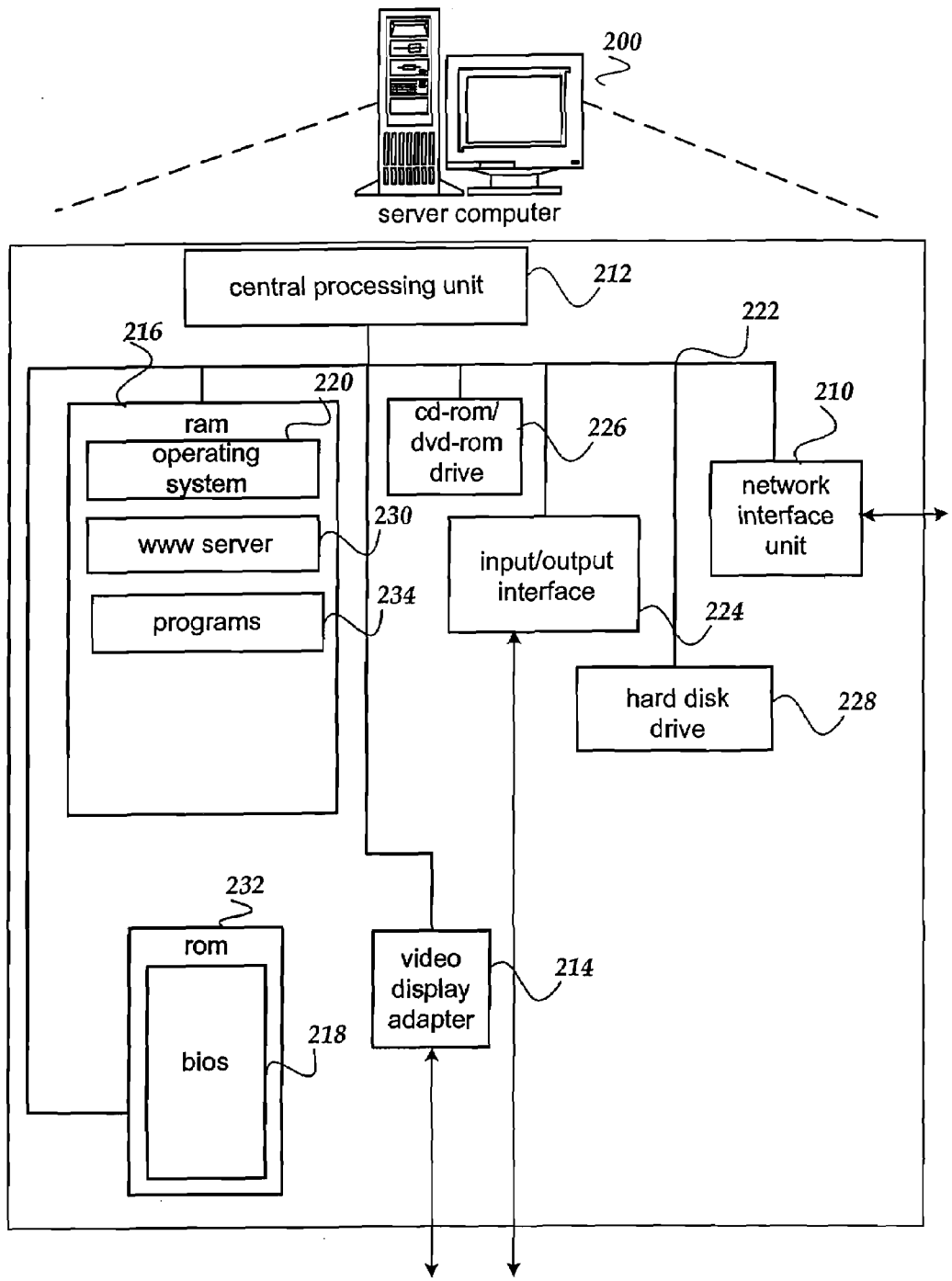
Figure 3:
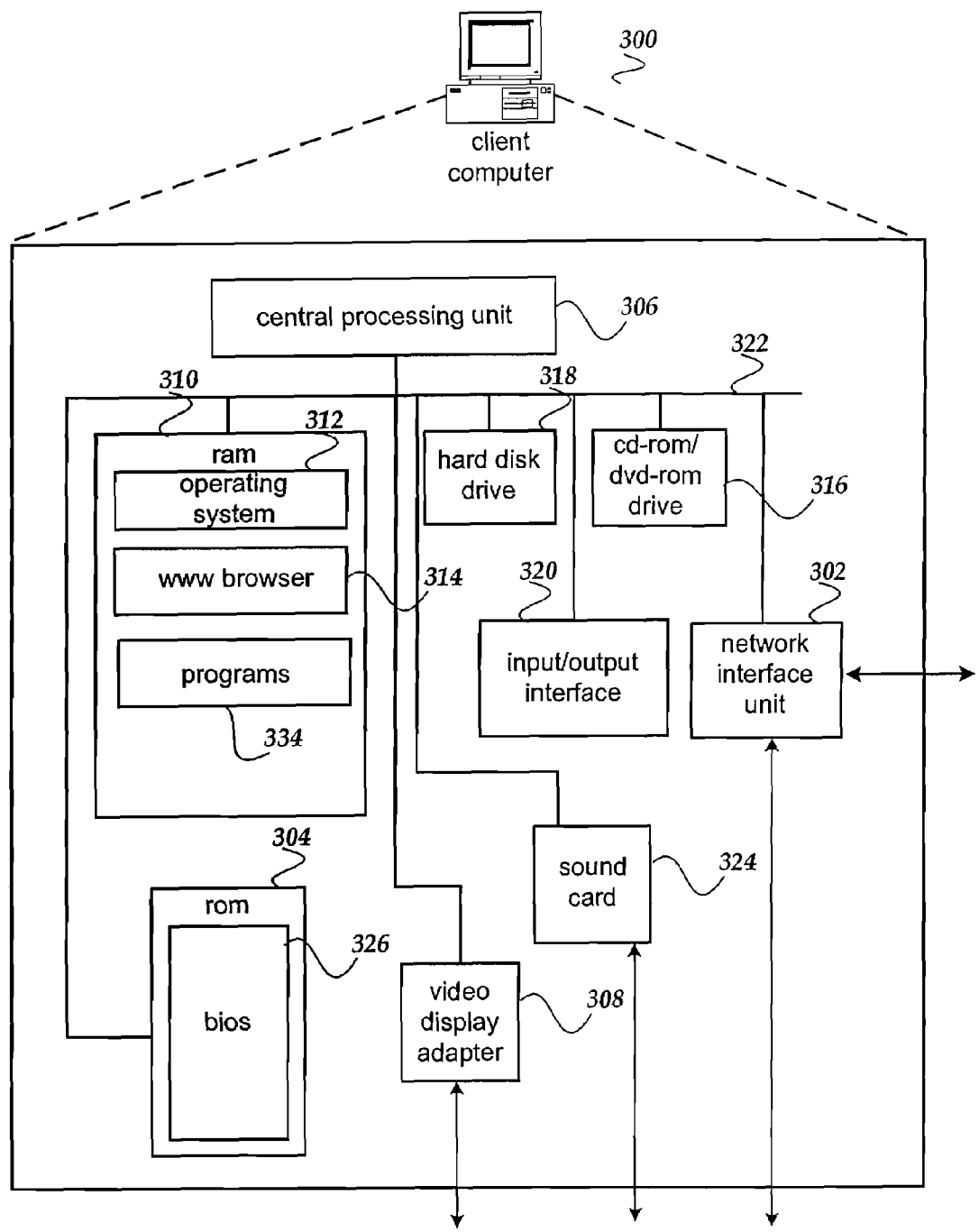

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") $120_{a-d}$ and wide area network ("WAN") 130 interconnected by routers 110. Routers 110 are intermediary devices on a communications network that expedite packet delivery. On a single network linking many computers through a mesh of possible connections, a router receives transmitted packets and forwards them to their correct destinations over available routes. On an interconnected set of LANs—including those based on differing architectures and protocols—, a router acts as a link between LANs, enabling packets to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANS $120_{a-d}$ or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and packets. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send packets to other users via email by using links on the Web page.

A server providing a WWW site, as the server described in more detail in conjunction with FIG. 2 may, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, and/or provide other services, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

It will be appreciated that the server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system including, for example, UNIX, LINUX™, or one produced by Microsoft Corporation of Redmond, Wash. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 may also comprise input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored. A server and devices similar to a server are examples of a network device.

FIG. 3 depicts several components of client computer 300. Client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304 and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner. A client and devices like a client are other examples of a network device. Any other device that is capable of connecting to a network may also be included as an example of a network device.

As will be recognized from the discussion below, aspects of the invention may be embodied on routers 110, on server 200, on client computer 300, or on some combination of the above. For example, programming steps may be contained in programs 334 and/or programs 234. Distributing may be performed by one or more servers, such as server 200 or by specialized hardware on a router such as routers 110.

Illustrative Traffic Distributing Systems

Figure 4:
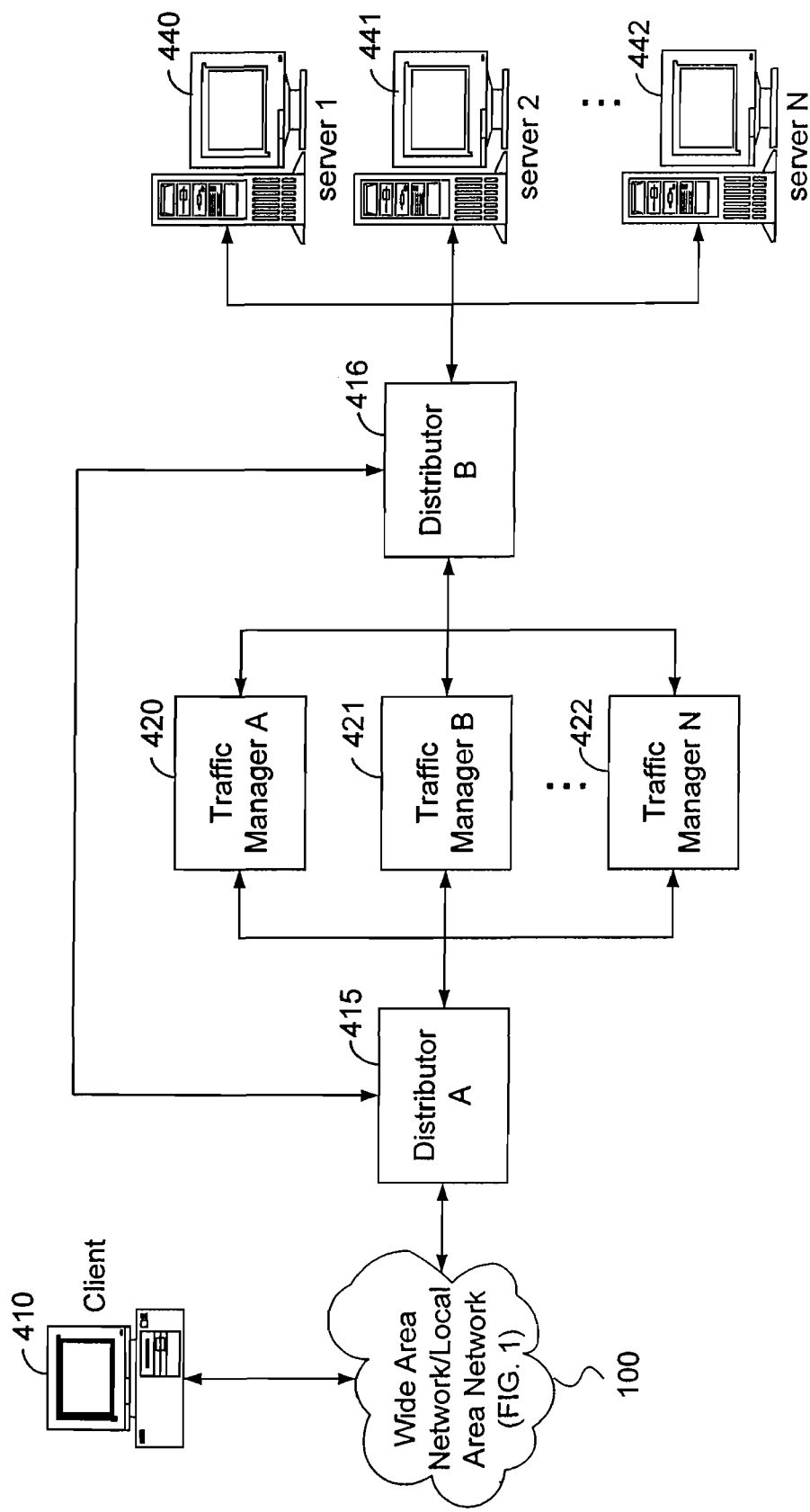
FIG. 4 illustrates an exemplary environment in which a system for distributing traffic to an array of traffic management devices operates.

FIG. 4 illustrates an exemplary environment in which a system for distributing traffic through an array of traffic management devices operates, according to one embodiment of the invention. The system includes client 410, distributors 415-416, traffic management devices 420-422, and origin servers 440-442.

Client 410 is coupled to distributor 415 over WAN/LAN 100. Distributor 415 is coupled to distributor 416 through traffic management devices 420-422. Distributor 415 also has a more direct connection to distributor 416. Distributor 416 is coupled to origin servers 440-442.

Client 410 is any device capable of connecting with WAN/LAN 100. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client 410 may be any device that is capable of connecting using a wired or wireless communication medium such as a PDA, POCKET PC, wearable computer, or other device mentioned above that is equipped to use a wired and/or wireless communications medium. An exemplary client that may connect with WAN/LAN 100 is client computer 300 of FIG. 3.

Distributor 415 receives information in the form of packets. Each packet may convey a piece of information. A packet may be sent for handshaking, i.e., to establish a connection or to acknowledge receipt of data. A communication includes a group of related packets sent between two devices, such as client 410 and server 440. For example, to request a Web page, client 410 may send some packets requesting a connection, e.g., handshaking packets, server 440 may respond with other handshaking packets. Then client 410 may send a packet requesting a particular Web page. Server 440 may respond by sending data packets associated with the Web page. Finally, client 410 may end a communication by sending some more handshaking packets which server 440 may respond to with other handshaking packets. In essence, a communication includes all packets needed or necessary for a transaction to occur. A communication or part of a communication may also be referred to as a flow or as a flow of packets.

A packet may come from various senders including client 410, traffic management devices 420-422, distributor 416 or origin servers 440-442. The packet may include information such as a request, response, or configuration command. Generally, packets received by distributor 415 will be formatted according to TCP/IP, but they could also be formatted using another transport protocol, such as User Datagram Protocol (UDP), Internet Control Message Protocol (ICMP), NETbeui, IPX/SPX, token ring, and the like. Upon receipt of a packet, software and/or hardware associated with distributor 415 makes a determination as to where the packet should go. The software and/or hardware may be logic circuitry or software executing on the electronic device upon which distributor 415 resides and may be integrated with distributor 415 or it may execute or reside elsewhere. The software and/or hardware may access a database, a table, or other information to determine an action to perform upon receipt of a packet, or it may be "hard-wired" to perform a certain action depending pre-defined conditions. Exemplary devices that may be used to implement a distributor include server 200 of FIG. 2 and client 300 of FIG. 3, configured with appropriate hardware and/or software. Other exemplary devices include a switch chassis or some other custom hardware/software solution including one or more processors and network interfaces.

For example, a user on client 410 may be requesting a Web page associated with a URL, such as http://www.myfavorites.com. If this is a Web page that is serviced by origin servers 440-442, distributor 415 forwards the request to one of traffic management devices 420-422. A user on client 410 may request communication specifically with one of the traffic management devices. In this case, distributor 415 forwards the request to the specified traffic management device. For example, the user may wish to configure the traffic management device, install new software, provide maintenance, or some other activity. The user may wish to configure distributor 415. In this case, distributor 415 processes the communication itself. Distributor 415 may receive a response to a previous request from one of traffic management devices 420-422. Distributor 415 may then forward this request to the recipient by sending it to WAN/LAN 100. A user may send a packet directed specifically at one of origin servers 440-442. In this case, distributor 415 may send the packet to distributor 416 for relaying the packet to the specified server.

When requests for content come to distributor 415, distributor 415 may be required to ensure that a request from the same source is sent through the same traffic management device. The traffic management device may maintain state information, among other things, about connections between origin servers 440-442 and requestors, such as client 410. If distributor 415 does not refer a request or information from the same user to the same traffic management device, traffic management devices may share connection state information which each other so that flows of packets or relationships between flows of packets are not disrupted. Typically, distributor 415 forwards requests as described in more detail in conjunction with FIGS. 8-12.

Sometimes, when distributor 415 receives a packet, it acts like a router or switch, forwarding the packet toward the intended recipient. For example, distributor 415 may receive a request to connect with server 440. Distributor 415 may forward this request to distributor 416 for forwarding to server 440. Distributor 415 may receive a packet from distributor 416 or from traffic management devices 420-422 that is directed to a client, such as client 410. In this case, distributor 415 forwards the packet to WAN/LAN 100 (or a router thereon). Alternatively, if client 410 is a device distributor 415 is more closely connected to, distributor 415 may send the packet directly to client 410.

Distributor 415 may use a different algorithm for forwarding packets directed to traffic management devices 420-422 than for packets from traffic management devices 420-422. For example, when packets are directed to traffic management devices 420-422, distributor 415 may perform a hash on the sender's IP address to determine which traffic management device the packet should be sent to. When distributor 415 receives a packet from a traffic management device, however, it may forego applying a hash.

A hash is a function or algorithm that maps a set of input values to a set of output values. Typically, a hash is used when the set of input values has more elements than the set of output values. Some hashes when applied to a set of input values will map the input values approximately equally over the set of output values. Other hashes will map the input values disproportionately to a set of output values. For example, one traffic management device may be able to deal with twice as many packets as another traffic management device. A hash could be constructed to map input packets to the one traffic management device twice as often as mapping packets to the other traffic management device. Generally, a hash is deterministic. That is, the hash will produce the same output value whenever a particular input value is hashed on.

Traffic management devices 420-422 receive packets sent from distributors 415 and 416. In some operations, traffic management devices 420-422 act like layer 7 switches. That is, they may look at content associated with higher TCP/IP layers of the packet, e.g. a request for a page such as http://www.favorites.com and information that identifies the user, such as a cookie, etc. They may store information in memory so that next time the requestor requests more information from http://www.favorites.com, each request is sent to the same server. They may do this, in part, to ensure that the user is connected to the server that the user previously connected to. This helps prevent the loss of transaction data, such as items in a shopping cart.

In addition, traffic management devices 420-422 may perform network address translation (NAT). That is, in a TCP/IP packet, they may change the source and/or destination field. This may be done for many reasons. One reason is so that intranets can keep their own private address space and not have to use publicly routable addresses, which may be difficult to obtain. Another reason is that each traffic management device is configured to cause future communications to and from a server to flow through the traffic management device, so that the traffic management device may maintain state information about the connection. The traffic management device may need state information to gracefully close a connection if, for example, the server fails. In addition, the traffic management device may need state information to reroute a connection to another server if the server fails. Another reason the traffic management device may be configured to have all future packets in a flow of packets pass through it is for security and/or anonymity purposes.

For example, if a server, such as server 440, requested stock information from a stock server (not shown) connected to WAN/LAN 100, the server would give its IP address as the source address so that the stock server would know where to respond to. The traffic management device through which the request travels, for example, traffic management device 420, could replace the source IP address of the request with an IP address associated with traffic management device 420 so that the stock server would respond to distributor 415 instead of server 440. Provided that distributor 415 routes the response from the stock server through traffic management device 420, this allows traffic management device 420 to maintain state information, provide security, and gracefully shut down or transfer a connection between the stock server and server 440.

Traffic management devices, such as traffic management devices 420-422, are any devices that manage network traffic. Such devices include, for example, routers, proxies, firewalls, load balancers, devices that perform network address translation, any combination of the preceding devices, and the like. A traffic manager may, for example, control the flow of data packets delivered to and forwarded from an array of application servers, such as Web servers. A traffic manager may direct a request for a resource to a particular Web server based on network traffic, network topology, capacity of the server, content requested, and a host of other load balancing metrics. A traffic manager may receive data packets from and transmit data packets to the Internet, an intranet, or a local area network accessible through another network. A traffic manager may recognize packets that are part of the same communication, flow, and/or stream and may perform special processing on such packets, such as directing them to the same server so that state information is maintained. A traffic manager may support a wide variety of network applications such as Web browsing, email, telephony, streaming multimedia, and other traffic that is sent in packets.

A traffic management device may be implemented using one or more personal computers, POCKET PCs, wearable computers, processors, multiprocessor systems, microprocessor-based or programmable consumer electronics, network PCs, cell phones, smart phones, pagers, walkie talkies, radio frequency (RF) devices, infrared (IR) devices, CBs, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high speed switch fabric while the microprocessors may perform higher layer processing of packets. An exemplary device that could be used as a traffic management device is server computer 200 of FIG. 2, configured with appropriate software. A traffic management device may have multiple network interface units and each network interface unit may interface with one or more networks. Traffic manager as it is used in this document means traffic management device.

Distributor 416 receives communications and forwards them to one or more of server 440-442, to distributor 415, or to traffic management devices 420-422. When delivering packets to traffic management devices 420-422, distributor 416 may be configured to hash on a destination IP address so that the traffic management device that sent a packet to a particular server receives the server's response. Distributor 416 may act as a switch or router in relaying packets to intended recipients. Although distributor 416 is shown as having one shared communications link (segment) going between it and origin servers 440-442, it may have dedicated communications links to each of origin servers 440-442.

Origin servers 440-442 may include one or more WWW servers, such as server 200 of FIG. 2, or other general-purpose servers. Origin servers 440-442 may serve content for more than one vendor. For example, a group of vendors may each run their Web sites using one or more origin servers 440-442. Origin servers 440-442 may perform other services besides serving Web pages.

Figure 5:
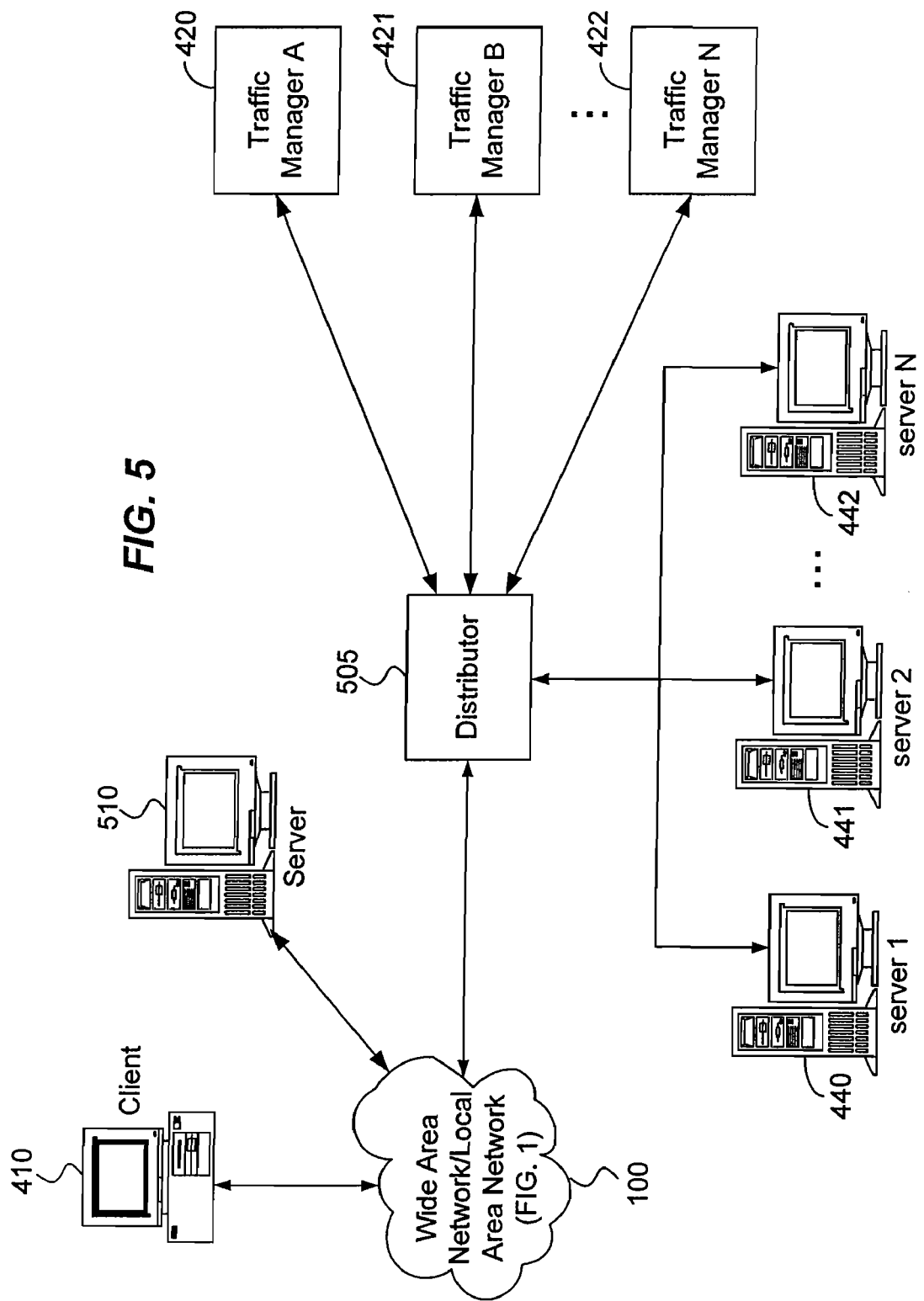
FIG. 5 shows another exemplary environment in which a system for distributing traffic to an array of traffic management devices operates.

FIG. 5 shows another exemplary environment in which a system for distributing traffic through an array of traffic management devices operates, according to one embodiment of the invention. The system includes client 410, distributor 505, server 510, traffic management devices 420-422, and origin servers 440-442.

Client 410 and server 510 are each coupled to distributor 505 over WAN/LAN 100. Distributor 505 is coupled to traffic management devices 420-422 and origin servers 440-442.

Components numbered similarly to those in FIG. 4 operate similarly. A difference between the environment shown in FIG. 5 and that shown in FIG. 4 is that the functionality of distributors 415-416 has been combined in distributor 505. In addition, distributor 505 is shown as having dedicated communication links (segments) to each of origin servers 440-442. It will be understood that distributor 505 may also be configured to have more than one traffic management device connected to each communication link.

Similarly, although FIG. 5 shows each of origin servers 440-442 sharing a communications link, each server may be placed on its own dedicated communication link or paired with one or more other servers without departing from the spirit or scope of the invention.

In general, distributor 505 operates logically like the combination of distributors 415 and 416. Inter-distributor packets, e.g. ones sent directly from distributor 415 to distributor 416, are no longer necessary with distributor 505. A packet that is sent from client 410 addressed directly to a server, such as server 440, may be routed directly to the server instead of passing through two distributors. Likewise, a packet sent from a server directly to the user may be routed directly to WAN/LAN 100 instead of passing through two distributors.

Server 510 is any device capable of connecting with WAN/LAN 100 and responding to requests from other devices, such as Web page requests. The set of such devices capable of acting as a server may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, server 510 may be any device that is capable of connecting using a wired or wireless communication medium such as a PDA, POCKET PC, wearable computer, or other device mentioned above that is equipped to use a wired and/or wireless communications medium. An exemplary server hat may connect with WAN/LAN 100 is server 200 of FIG. 2.

The configuration of FIG. 5 may be used for various reasons including to lower costs (by providing one instead of two distributors) or because a system does not need the capacity of two distributors.

Illustrative Method of Distributing Traffic

Figure 6:
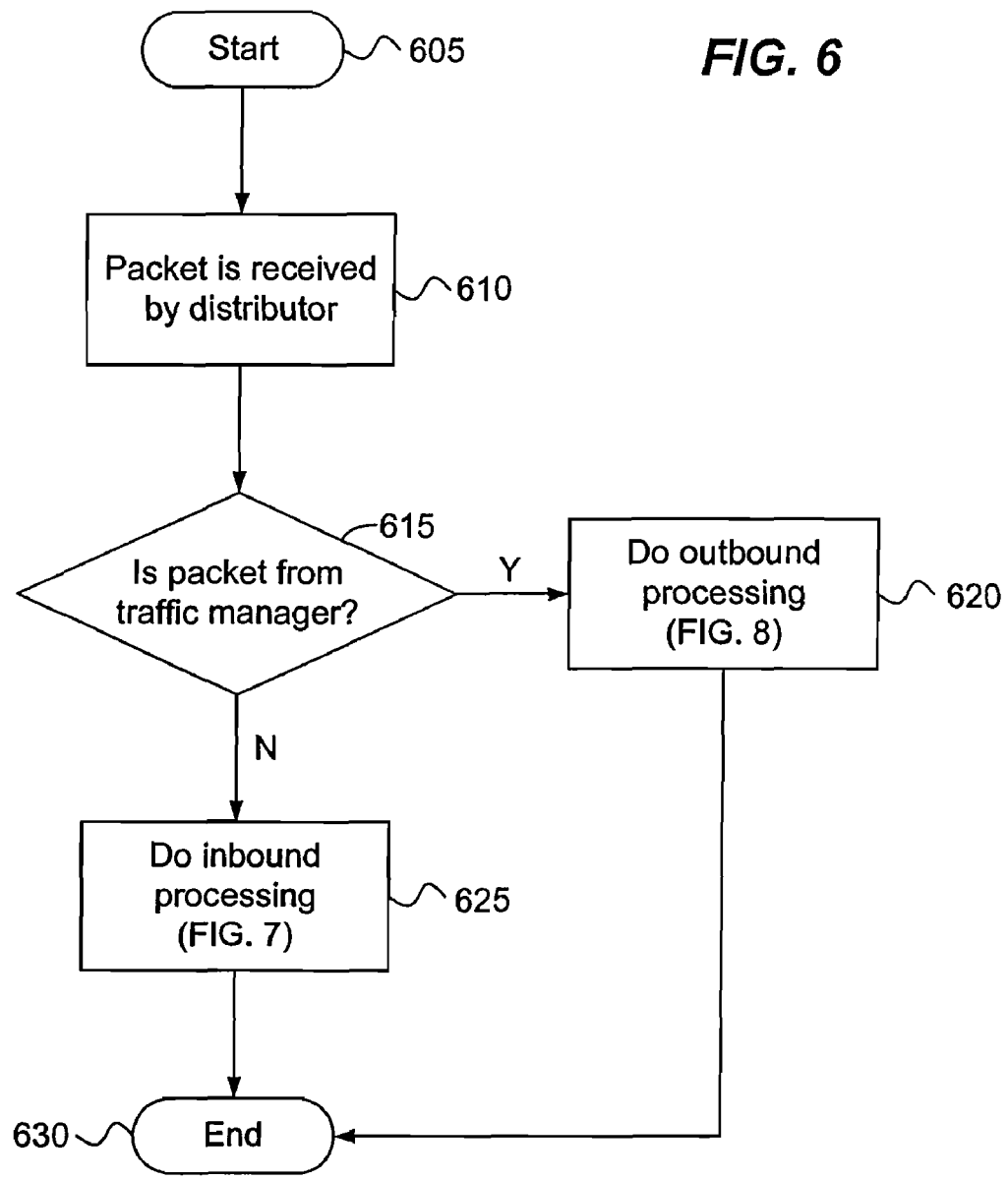
FIG. 6 illustrates a flow chart for processing inbound and outbound packets.

FIG. 6 illustrates a flow chart for processing inbound and outbound packets, according to one embodiment of the invention. The process begins at block 605 when a distributor, such as distributor 505 of FIG. 5, is ready to receive a packet.

At block 610, the packet is received. For example, referring to FIG. 5, a packet sent from client 410 requesting a web page from http://www.myfavorites.com is received by distributor 505.

At block 615, a determination is made as to whether the packet is from a traffic management device. Packets from traffic management devices receive different treatment than packets to traffic management devices. Generally, such packets are directed to a client computer, such as client 410 of FIG. 5, or are directed to a server, such as server 440. Typically, distributor 505 does not need to apply a hash to such packets to determine where they go, although in some cases, as will be described in conjunction with FIG. 8, distributor 505 may be required to change the source media access control (MAC) layer address. When a packet is from a traffic management device, processing branches to block 620; otherwise, processing branches to block 625. For example, upon receiving a request from client 410 for a web page from http://www.myfavorites.com, processing branches to block 625.

Figure 8:
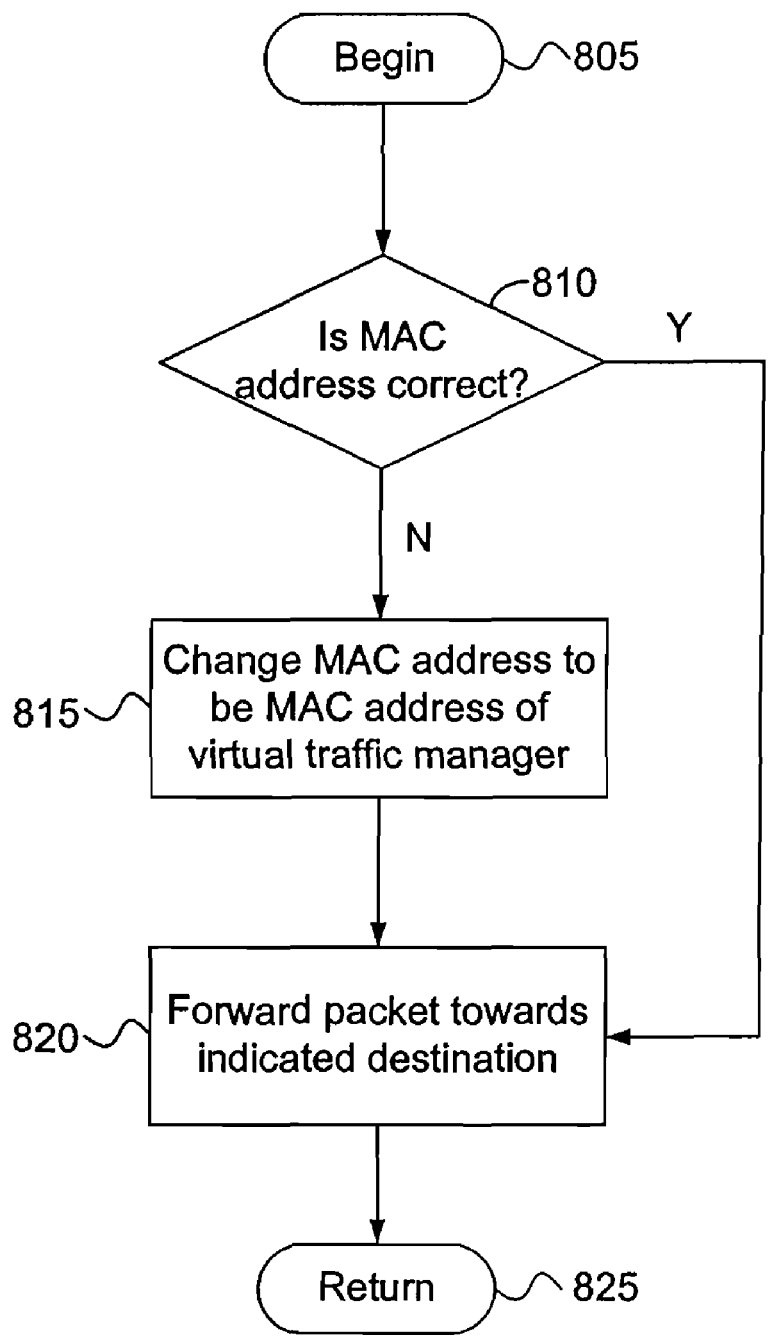
FIG. 8 illustrates a flow chart for processing that may occur when a packet is received from a traffic management device.

At block 620, outbound processing is performed as described in more detail in conjunction with FIG. 8. Briefly, the source MAC address on the packet may be changed to cause a response to the packet to be directed appropriately.

Figure 7:
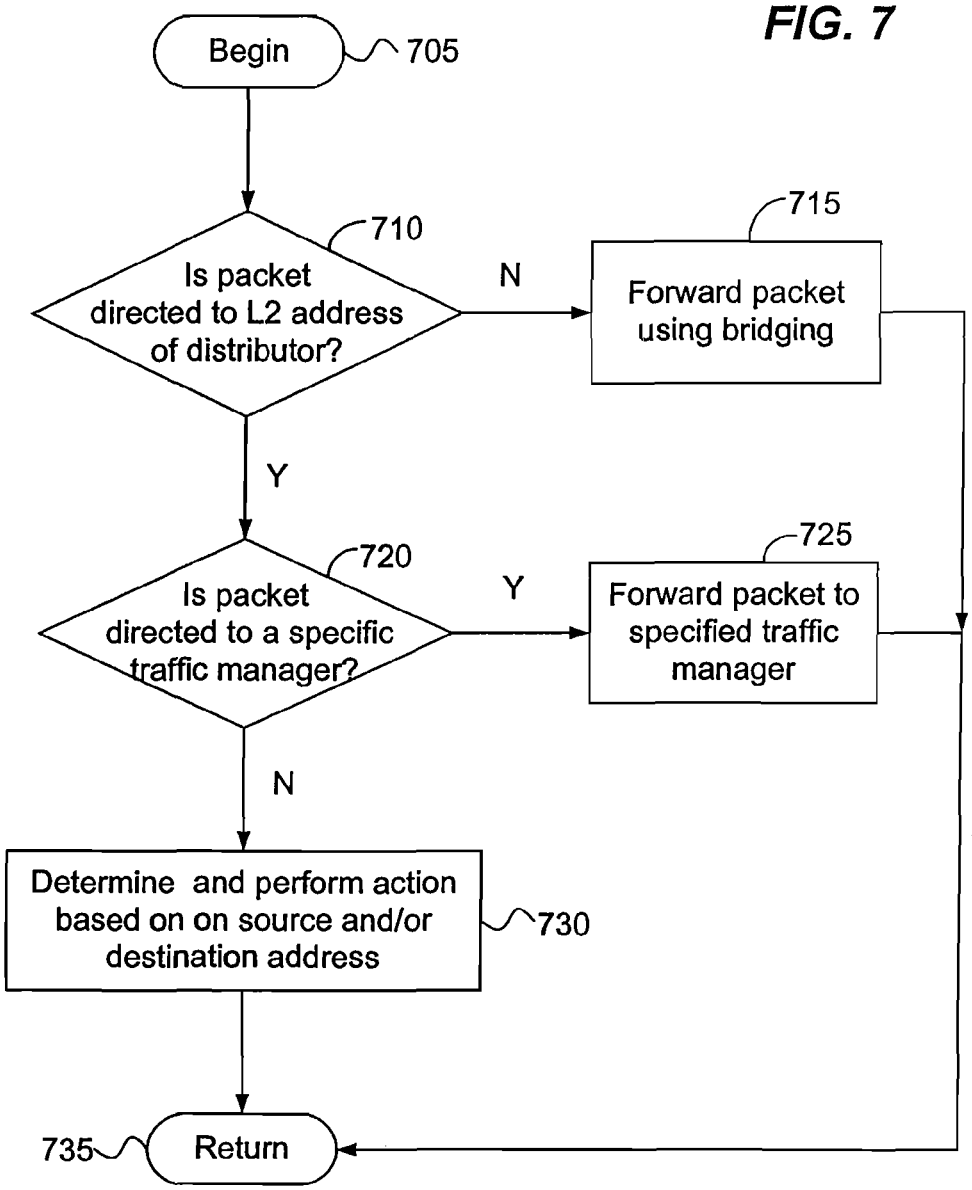
FIG. 7 shows a flow chart for determining where to forward packets received by a distributor from anywhere but a traffic management device.

At block 625, inbound processing is performed as described in more detail in conjunction with FIG. 7. Briefly, to keep packets traveling through the same traffic management device, information about where the packet came from and where it is going is used to forward the packet.

At block 630, processing ends. At this point, a packet has been received by the distributor and processing has occurred, depending on whether the packet came from or was directed to a traffic management device. Another packet may be distributed by repeating the process above.

FIG. 7 shows a flow chart for determining where to forward packets received by a distributor from anywhere but a traffic management device, according to one embodiment of the invention. The process begins at block 705 after it is determined that the packet is directed to the network upon which the traffic management devices are located.

At block 710, a determination is made as to whether the packet is directed to the layer 2 address of the distributor. When it is, processing branches to block 720; otherwise, processing branches to block 715. The layer 2 address generally refers to the media access control (MAC) layer. A packet may be directed to the layer 2 address of the distributor by including the distributor's MAC address as the destination address in a packet. Alternatively, a packet may be directed to the distributor by virtue of its transmission to a specified physical or logical port on the distributor. Whenever a packet arrives on a particular physical port, this may indicate that the packet is intended for the distributor. A packet may also be directed to the distributor using the virtual local area network (VLAN) standard. The essence of the question asked in block 710 is whether the packet is addressed to layer 2 address of the distributor.

A distributor may act as a layer 2 switch. That is, it may examine packets sent on segments attached to it. If it finds a packet that is directed to a device on another segment the distributor is attached to, the distributor may forward this packet to the other segment. This is known as layer 2 switching or bridging. These packets will generally not be addressed specifically to the distributor; rather, the distributor may "listen" for and forward packets for which it has information about where the recipient is connected. When it finds such a packet, it forwards the packet using bridging (layer 2 switching) mechanisms.

Alternatively, the distributor may be structured without layer 2 switching capability. That is, it may ignore any packet that is not addressed to the distributor's layer 2 address. In this case, blocks 710 and 715 may be eliminated.

When a packet is directed to the layer 2 address of the distributor, typically, this means that the packet is either meant to be sent to another node or is directed to the traffic management devices the distributor distributes traffic to. These conditions will be discussed more below.

At block 715, the packet may be forwarded using bridging. That is, the packet is not distributed using a hashing algorithm; rather, the address, possibly a MAC address, is used to determine to which segment the packet should be sent. This may be done using layer 2 switching techniques. Alternatively, the packet may be discarded, with or without a reply to the sender, if it is determined that there is not a device associated with the address. For example, referring to FIG. 5, distributor 505 "sees" a packet destined for an administrative device (not shown) on a segment connected to distributor 505. The administrative device may be, for example, a network utilization monitor (not shown) that tracks how much traffic occurs on a segment. A network administrator using client 410 may desire to download the most recent statistics from the monitor. To do so, the network administrator sends a request directed to the device. Distributor 505 sees the request on one of its segments, does a lookup in a layer 2 switching table, and determines that the packet should be forwarded to another segment upon which the network utilization monitor is connected. The distributor then forwards the packet to the other segment using layer 2 switching (bridging).

At block 720, a determination is made as to whether the packet is directed to a specific traffic management device. If it is, processing branches to block 725; otherwise, processing branches to block 730. For example, a network administrator may desire to configure a traffic management device to use a different load balancing algorithm. To do so, the network administrator may establish a network connection using an IP address associated with a specific traffic management device.

At block 725, the packet is forwarded to the specified traffic management device. For example, referring to FIG. 5 distributor 505 receives a packet specifically directed to traffic management device 420 and delivers the packet to traffic management device 420

Figure 10:
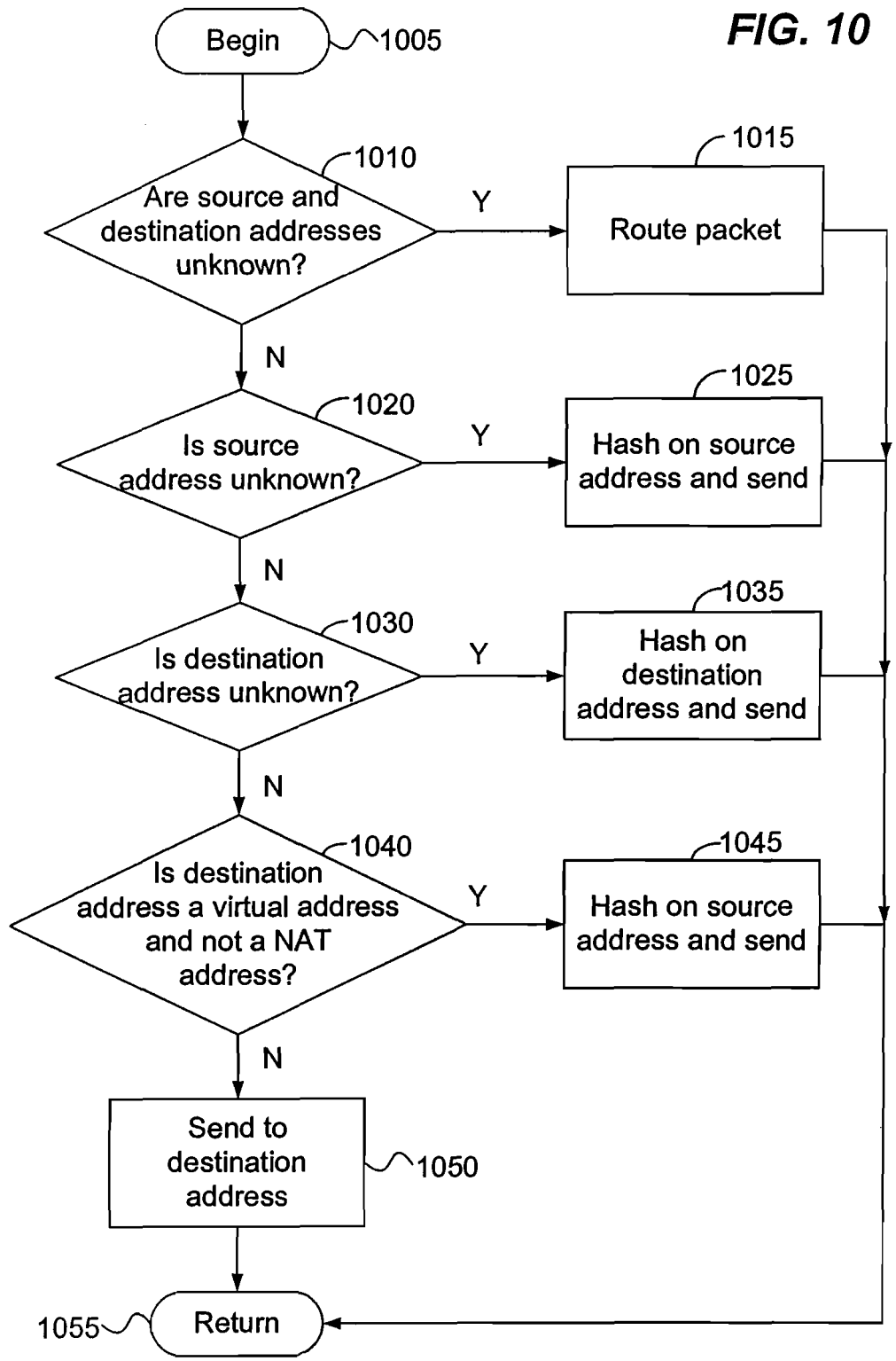
FIG. 10 illustrates a flow chart that shows another way of implementing the functionality of the table shown in FIG. 9.

At block 730, a determination is made as to what action to perform based on information in the packet as described in more detail in conjunction with FIGS. 9 and 10. Then, the determined action is performed. One example of an action that may be performed is distribution of the packet to a traffic management device. Briefly, the source and/or destination addresses may be examined to determine to which traffic management device to distribute the packet. To distribute the packet, sometimes a hash may be performed on the source and/or destination address(es). For example, referring to FIG. 11, distributor 505 may determine that the packet should be distributed to a traffic management device. When distributor 505 receives a packet from client 410, with an IP address and port number of, for example, 12.228.54.3:9444, distributor 505 may hash on the client's IP address and forward the packet to traffic management device 420.

Another example of an action that may be performed is routing. For example, referring to FIG. 5, distributor 505 may also act as a router. When it receives a packet that is not bound for a traffic management device, e.g., packets bound for a device connected to another network (not shown) or packets bound for a device for which traffic management devices do not need to keep connection state, it may forward the packet to the other network or device as a router would, e.g., by looking up information in a routing table and forwarding the packet appropriately.

As a further example of routing, client 410 may send a packet addressed specifically to one of origin servers 440-442, e.g. server 440. Distributor 505 may be a router servicing server 440. Being sent from another router, the packet would be directed to distributor 505's layer 2 address, but the layer 3 address would indicate that the packet was destined for a device connected to distributor 505, rather than distributor 505 itself. For example, the destination MAC (layer 2) address of the packet may be the MAC address of distributor 505; but, the IP (layer 3) address of the packet may be 192.168.3.5, the IP address of server 440. When distributor 505 receives a packet that has a destination MAC address of distributor 505 but a layer 3 address of another device, distributor 505 may look up the layer 3 address and determines where to forward the packet to, in this case, server 440.

In another embodiment of the invention, distributor 505 does not include routing capability. In this case, it may simply discard the packet, return it to the sender, or forward it to a default location.

At block 735, the process returns to the calling process. At this point, the packet may have been forwarded using layer 2 switching, forwarded to a specific traffic management device, forwarded using layer 3 routing, discarded, or distributed to a traffic management device.

FIG. 8 illustrates a flow chart for processing that may occur when a packet is received from a traffic management device, according to one embodiment of the invention. The process begins at block 805 after a packet has been received from a traffic management device.

At block 810, a determination is made as to whether the MAC (layer 2) source address of the packet is "correct." When it is, processing branches to block 820; otherwise, processing branches to block 815. "Correct" means that a device responding to the packet would send a packet to the MAC address associated with all of the traffic management devices rather than the MAC address associated with the sending traffic management device (unless the two addresses are the same). For example, referring to FIG. 11, switch 1205 may be an unsophisticated layer 2 switch that is unable to translate the source MAC address in packets from each of traffic management devices 420-422 into a single MAC address. The result may be that a device communicating with distributor 505 uses the MAC address of a traffic management device rather than the MAC address of the group of traffic management devices. This may cause distributor 505 to forgo distributing traffic to the traffic management devices and to send the packet directly to the traffic management device associated with the MAC address. It may also cause other problems with other devices connected to WAN/LAN 100 or elsewhere. This problem may be corrected by replacing the source MAC address with a common or group traffic management device MAC address in packets sent from traffic management devices through an unsophisticated switch. Then, a device responding to the packet would try to respond to the group traffic management device MAC instead of the actual MAC of the device. This allows distributor 505 to utilize its normal distribution methods in sending the packet.

At block 815, the MAC source address in the packet is replaced by a MAC address associated with the group of traffic management devices. This may be the MAC address of the distributor. For example, referring to FIG. 11, traffic management device 422 sends a packet with its real MAC address to switch 1205 which forwards it to distributor 505. Distributor 505 replaces the source MAC address with distributor 505's MAC address.

At block 820, the packet is forwarded towards its indicated destination. This may be done through routing, layer 2 switching, or other forwarding algorithms. For example, referring to FIG. 11, distributor 505 forwards the packet to server 440 using layer 2 switching.

At block 825, the process returns to the calling process. At this point, the source MAC address of the packet has been changed, if necessary, and the packet forwarded towards its destination.

Exemplary Data Structure

FIG. 9 shows an exemplary table that may be used in distributing traffic, according to one embodiment of the invention. The table is for use with traffic management devices that may perform network address translation (NAT). The table assists a distributor to ensure each packet that is part of a communication between a client and a server, such as client 410 and server 1 of FIG. 5, flow through the same traffic management device, such as traffic management device 420. Each cell in the table gives an action to perform based on attributes found in the source and destination addresses. A source or destination address may be an IP address, a port address, such as UDP or TCP, VLAN ID, physical port identifier, physical port, or some combination thereof. Alternatively, a source or destination address may be some other layer 1-7 address. The table applies to any packet that is not sent from a traffic management device. Terms in the table are defined below.

NAT-able. NAT-able essentially means if a traffic management device received a packet from a device with this source address, would the traffic management device translate the source address to another address. As explained previously in conjunction with FIG. 4, a traffic management device may translate a source address so that the receiver of the packet responds to the traffic management device, not the sender of the packet. This allows the traffic management device to maintain connection state as described earlier.

Node address. Node address means is the packet from one of the servers that the traffic management devices load balance connections to. Referring to FIG. 5, the servers traffic management devices 420-422 load balance packets to include origin servers 440-442.

&&. The symbol "&&" means and. So, in the condition NAT-able && Node Address, the source address must be both NAT-able and a node address to satisfy the condition.

Unknown address. Unknown address means that to the traffic management device, the address is unknown or, even if known, no special or different processing occurs based solely on the address. For example, generally when a client, such a client 410, sends a packet that is distributed to a traffic management device, such as traffic management device 420, client 410's address is unknown to the traffic management device. In addition, the address of a packet sent from a server, such as server 440, may also be unknown to the traffic management device. Each server may be associated with more than one address. A traffic management device may recognize one or more addresses as belonging to servers that the traffic management device sends packets to for load balancing. One or more addresses may be addresses to which a traffic management device does not send packets to for load balancing. Thus, a server, such as server 440, could send a packet using an address "unknown" to a traffic management device. This could happen, for example, if the server was also used as a personal computer or otherwise which was associated with an "unknown" address for such uses.

NAT xlate. NAT xlate is short for NAT translation. Essentially, it means is this address an address that a traffic management device would translate a source address to when it performs a NAT? Generally, such an address is an address associated with the traffic management device (so that the receiver will respond to the traffic management device).

Virtual or Virtual address. Virtual, in this table, stands for virtual address. This is the address that a URL resolves to. For example, http://www.myfavorites.com may resolve to 12.32.22.33:80. A packet with the address is eventually forwarded to distributor 505 which determines if any of the traffic management devices service this Web page. When one or more traffic management devices load balance traffic for this Web page, the address is known as a virtual address.

With these definitions in mind, a distributor, such as distributor 505, looks at the source and/or destination addresses in a packet to determine an action to take. The above information, e.g. what are NAT-able addresses, node addresses, translation addresses, virtual addresses, etc., may be stored in a lookup table on the distributor. This lookup table may be updated automatically or manually through a user's intervention. Typically, the table would be updated to reflect information on the traffic management devices to which the distributor distributes traffic.

Now, the actions shown in the cells of the table will be defined. "Goto dest" is short for send the packet to the destination indicated in the destination address. An example of where this would occur is as follows: A server, such as server 440, requests stock prices from a server on the Internet, such as server 510. This request would pass through the distributor which would determine 1) that the source address is known (it is a node address); 2) the traffic management device would NAT the address (to make sure that all packets in the communication pass through it); and 3) that the destination address was unknown. Using this information, it would hash on the destination address and send the packet to a traffic management device, such as traffic management device 420. The traffic management device would NAT the source address by replacing it with either the address of a virtual address or an addresses associated with the traffic management device. Then, it would send the packet to the distributor which would then forward the packet to the WAN/LAN 100, the Internet in this case. The packet would eventually be delivered to the server which would respond to the source address of the packet (the one the traffic management device NAT-ed). When the response packet arrived at the distributor, the distributor would determine 1) that the source address is unknown (to the distributor), and 2) that the destination address is either a NAT xlate and possibly a virtual address. In either case, the distributor would forward the packet to the specified destination address (the traffic management device that performed the NAT). The traffic management device would then perform another NAT (to make sure that server 440 responded to the traffic management device instead of directly to server 510), and forward the packet to the distributor which would then forward the packet to server 440.

As can be seen by the example, "goto Dest" essentially means that the packet should simply be forwarded to the destination address without performing a hash on an address.

"Hash Src." Hash Src is short for hash on the source address. This distributes a packet to a traffic management device based on the source address. As will be seen by examples below, this, combined with hashing on destination, causes related packets to travel through the same traffic management device.

"Hash Dest." Hash Dest is short for hash on the destination address. This distributes a packet to a traffic management device based on the destination address.

Route. This means that the distributor employs regular routing mechanism to forward the packet towards its destination.

It will be recognized that this table is intended to mimic some of the decision making that occurs on traffic management devices. Yet, the distributor is not required to do layers 3-7 switching, a potentially computationally expensive operation; rather a lookup (relatively fast) is done and traffic distributed. Traffic management devices may be configured to direct packets differently than shown in this table. For such traffic management devices, an appropriate selection of actions that may be looked up without storing connection state information is contemplated and is within the scope and spirit of this invention.

FIG. 10 illustrates a flow chart that shows another way of implementing the functionality of the table shown in FIG. 9, according to one embodiment of the invention. The process begins at block 1005 when a calling process calls the process. Terms in the flow chart should be interpreted as defined in FIG. 9.

At block 1010, a determination is made as to whether the source and destination addresses are unknown. When they are, processing branches to block 1015; otherwise, processing branches to block 1020. The source and destination addresses may both be unknown when a server, such as server 440 of FIG. 5, uses an "unknown" IP address associated with it to request information from a server, such as server 510.

At block 1015, the packet is routed towards the intended recipient using normal routing mechanisms. For example, distributor 505 forwards a packet from server 510 to server 440.

At block 1020, a determination is made as to whether the source address is unknown. If so, processing branches to block 1025; otherwise, processing branches to block 1030. Client 410 may request a page from http://www.myfavorites.com which is translated into an address that distributor 505 recognizes should be processed by traffic management devices 420-422.

At block 1025, the source address is hashed on and the packet sent to the traffic management device associated with the hash. This means that a hashing function is applied to the source address to distribute the packet to the traffic management device. For example, a request for a page from client 410 may cause distributor 505 to hash upon client 410's address and send the request to traffic management device 420.

At block 1030, a determination is made as to whether the destination address is unknown. If it is, processing branches to block 1035; otherwise, processing branches to block 1040. For example, in a response to a request from client 410, server 440 will send a packet addressed to client 410. Client 410's address, however, is generally "unknown" to distributor 505. Note, however, that by hashing on the destination address, distributor 505 sends the response to the same traffic management device that it sent client 410's request.

At block 1035, the destination address is hashed on and the packet sent to the traffic management device associated with the hash. This means that a hashing function is applied to the destination address to distribute the packet to a traffic management device. For example, distributor 505 hashes upon client 410's address (the destination address of the packet from server 440), and sends the response to traffic management device 420.

At block 1040, a determination is made as to whether the destination address is a virtual address and not a NAT address. When this is so, processing branches to block 1045; otherwise, processing branches to block 1050. For example, in a request from server 440 for stock prices from server 510, traffic management device 420 may perform a NAT on the source address, providing a virtual address associated with http://www.myfavorites.com. When server 510 responds to the virtual address, the source address should be hashed upon.

At block 1045, the source address is hashed on and the packet sent to the traffic management device associated with the hash. This means that a hashing function is applied to the source address to distribute the packet to a traffic management device.

At block 1050, the packet is sent to the destination address. For example, distributor 505 receives a packet that has a destination translated NAT address from a known source address. This might occur in a communication between server 440 and server 441 wherein server 440 requests information from http://www.myfavorites.com and the request gets load balanced to server 441.

At block 1055, the process returns to the calling process. At this point, the packet has been sent in such a way as to cause the flow of information to pass through the same traffic management device and server, when possible In light of this disclosure, it will be recognized that many variations of the processes shown in FIGS. 7, 8, and 10 may be implemented without departing from the spirit or scope of this invention.

Figure 11:
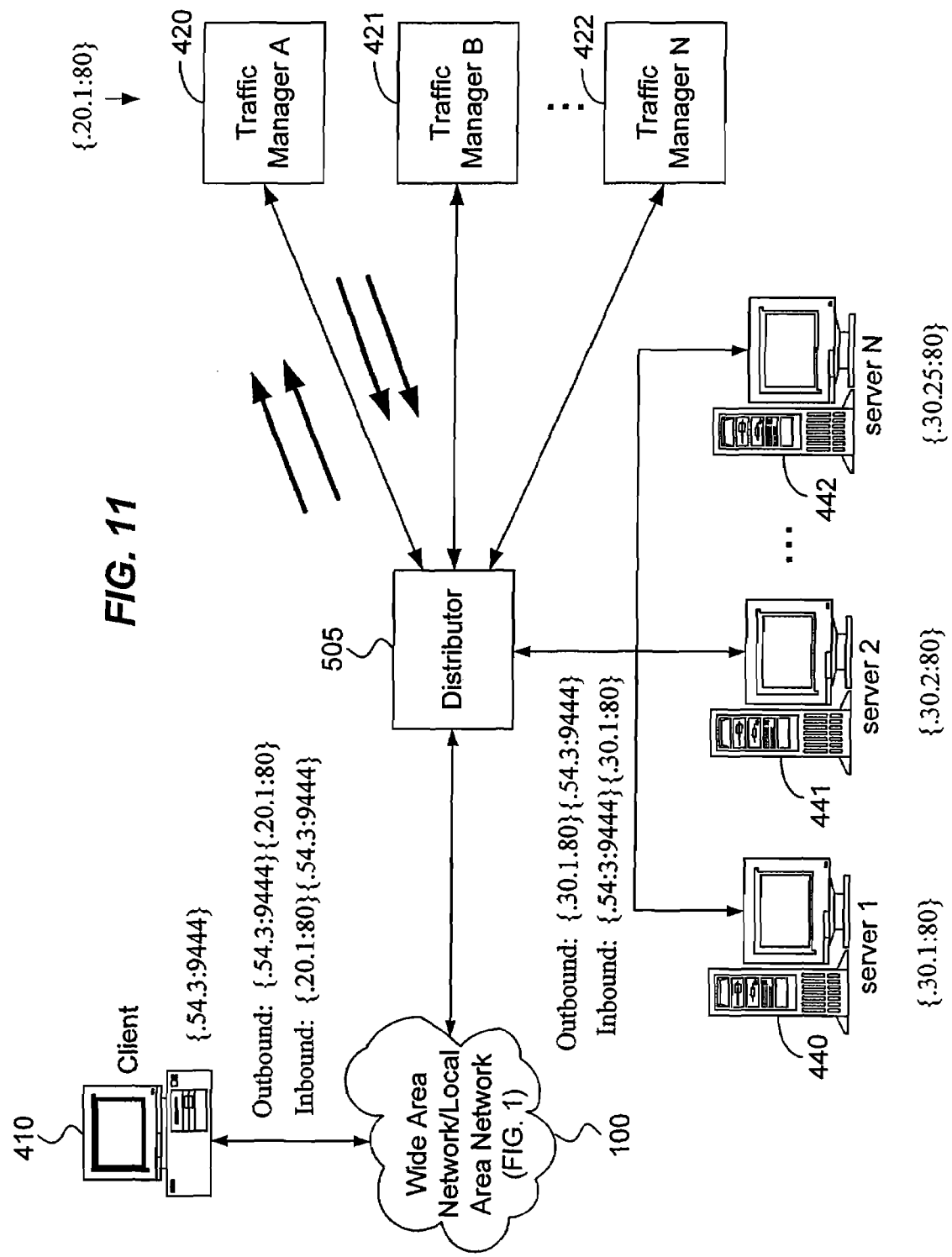
FIG. 11 shows an example of how packets may be sent between a client and server in an exemplary environment in which the system operates.

FIG. 11 shows an example of how packets may be sent between a client and server in an exemplary environment in which the system operates, according to one embodiment of the invention. The system includes client 410, distributor 505, traffic management devices 420-422, origin servers 440-442 and switch 1205.

Client 410 is coupled to distributor 505 over WAN/LAN 100. Distributor 505 is coupled to traffic management devices 420-422 and origin servers 440-442.

The functioning of this system is described in more detail in conjunction with FIG. 5. The discussion here will focus on a specific example of how a request from a client may flow through the system.

Assume that client 410 has an IP address of 12.228.54.3. and initiates a request for http://www.myfavorites.com using ephemeral port 9444. Assume also that the URL, http://www.myfavorites.com, is associated with the IP address 168.33.20.180 (what is known in this disclosure as a virtual address). When client 410 sends this packet, it travels through WAN/LAN 100 until it reaches distributor 505. Distributor 505 determines the packet as coming from an unknown source address, i.e., 12.228.54.3:9444, and that the packet is directed to a destination virtual address, i.e., 168.33.20.180. Based on the flow chart shown in FIG. 10, block 1045 is reached and the distributor sends the packet to one of the traffic management devices, suppose traffic management device 420, by hashing on the source address 12.228.54.3. Traffic management device 420 receives the packet, performs load balancing and determines that server 440 is best able to handle the packet. Traffic management device 420 changes the destination address of the packet to that of server 440, assume 168.33.30.180, and sends the packet to distributor 505. As this is a packet coming from a traffic management device directly to distributor 505 (not through an unsophisticated switch), distributor 505 does not need to stamp a different MAC address on the source address of the packet and sends the packet to server 440.

Server 440, receives the packet, prepares a response, and sends a response to distributor 505 with a source address of 168.33.30.180, i.e., the IP address of the server, and a destination address of 12.228.54.3:9444, the IP address of the client. Distributor 505 follows the logic shown in the flow chart in FIG. 7 and arrives at block 730. At block 730, the logic shown in FIG. 10 is followed. It is determined that the source address, i.e., server 440's address, is known, but the destination address, client 410's address, is unknown. This causes the logic in block 1035 to be executed, which causes a hash to occur on the destination address, i.e., the client's address. Note, that this is the same address (although now in the destination) that was hashed when the request came to distributor 505. This causes the response packet to be distributed to traffic management device 420.

Traffic management device 420 tracks the state information and probably performs a NAT on the source address. The source address could be changed to the virtual address of http://www.myfavorites.com, so that when the client responds, it does not try to respond directly to server 440; rather, a response packet is addressed to distributor 505 again. It will be understood that this sequence of events will cause the packets in a communication between any arbitrary client and server to be routed through the same traffic management device, provided the traffic management device remains active and other configuration changes are not performed during the communication.

Other Illustrative Traffic Distributing Systems

Figure 12:
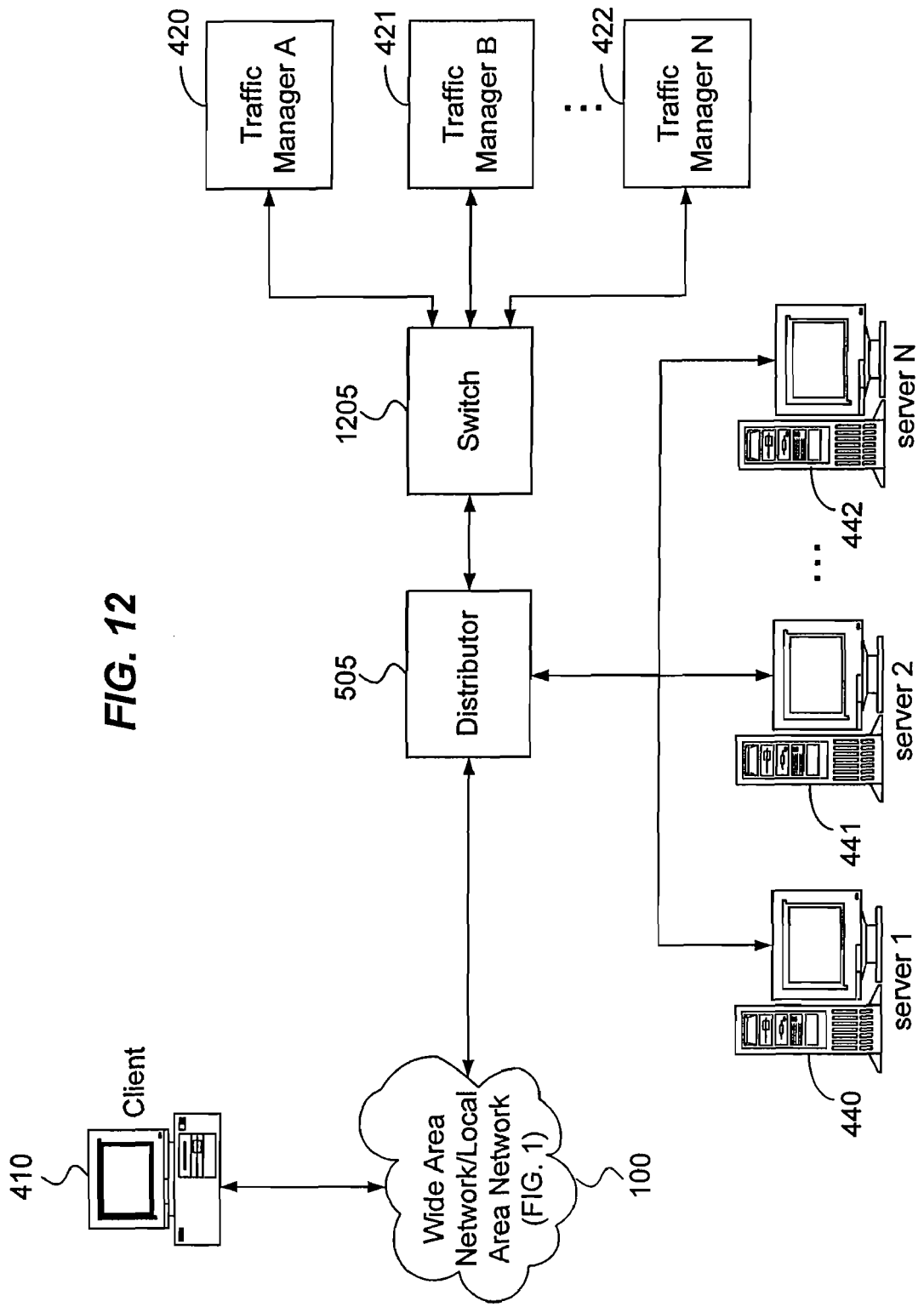
FIG. 12 illustrates an exemplary environment in which a system for distributing traffic to an array of traffic management devices operates.

FIG. 12 illustrates an exemplary environment in which a system for distributing traffic through an array of traffic management devices operates, according to one embodiment of the invention. The system includes client 410, distributor 505, traffic management devices 420-422, origin servers 440-442 and switch 1205.

Client 410 is coupled to distributor 505 over WAN/LAN 100. Distributor 505 is coupled to origin servers 440-442 through switch 1205. Distributor 415 is also coupled to traffic management devices 420-422.

A difference between the environment shown in FIG. 5 and the environment shown in FIG. 12 is that switch 1205 is inserted between distributor 505 and traffic management devices 420-422. Switch 1205 may be an unsophisticated "off-the-shelf" layer 2 switch as described above in conjunction with FIG. 8, or switch 1205 may be more sophisticated and able to do some translation of addresses or use a special type of addressing, such as VLAN addressing. With an unsophisticated switch, distributor 505 may change the MAC address on packets received from the switch, as described in more detail in conjunction with FIG. 8. With a switch capable of VLAN switching, the distributor may prepend address information in packets according with the VLAN standard to cause packets to be delivered to intended traffic management devices. It will be recognized that in FIG. 5, delivery of packets to traffic management devices 420-422 is done by virtue of the connection of each traffic management device to a separate port on distributor 505 and does not require an external switch.

Figure 13:
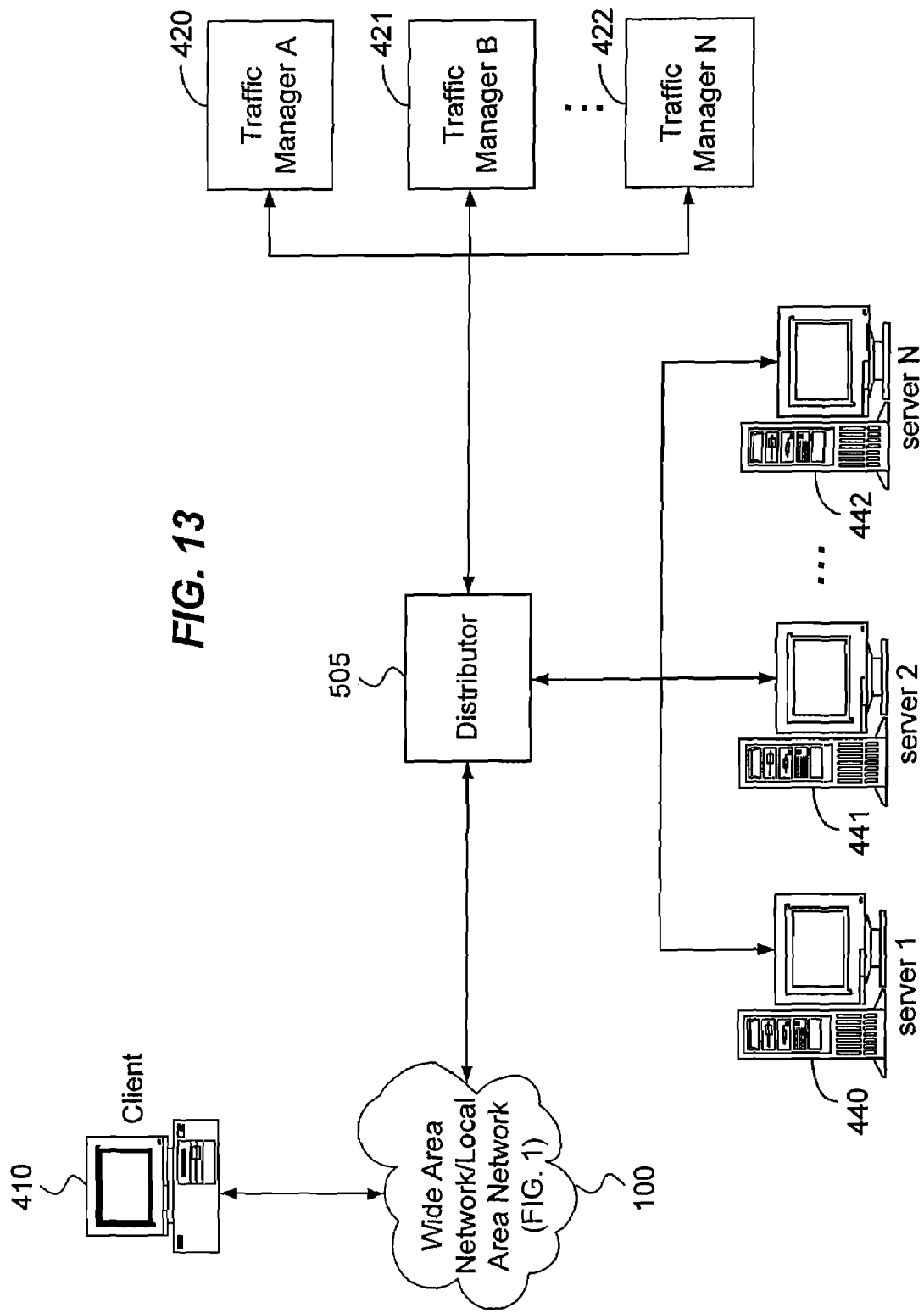
FIG. 13 shows another exemplary environment in which a system for distributing traffic to an array of traffic management devices operates in accordance with the invention.

FIG. 13 shows another exemplary environment in which a system for distributing traffic through an array of traffic management devices operates, according to one embodiment of the invention. The system includes client 410, distributor 505, traffic management devices 420-422, and origin servers 440-442. In this system, traffic management devices 420-422 are located on one physical segment of the network. When distributor 505 sends a packet to a traffic management device, it uses the MAC address of the distributor. In other respects, however, the system shown in FIG. 13 operates similarly to that shown in FIG. 5.

In other embodiments of the invention, one or more distributors may be integrated with one or more traffic management devices and switch fabric. In such embodiments, rather than changing MAC addresses, the switch fabric may encapsulate a data frame with a header that indicates the traffic management device to which the data frame should be sent. This may include a "virtual port" associated with a traffic management device. In addition, the traffic management device may be instructed to process data frames encapsulated with headers that identify the traffic management device. For example, the traffic management device may process data frames addressed to one or more virtual ports. In such embodiments, there may be no need to change the MAC address of a data frame to direct the data frame to the appropriate traffic management device.

In yet other embodiments of the invention, a packet is encapsulated in another packet that is addressed to a traffic management device. The packet may then be forwarded over a WAN/LAN to the traffic management device which then may unencapsulate the encapsulated packet to retrieve the packet encapsulated. The traffic management device may then process the retrieved packet appropriately.

It will be noted that in FIGS. 4, 5, 11, 12, and 13, origin servers 440-442 appear to be located on a shared network segment. In other embodiments of the invention, each one is on a dedicated network segment. In yet other embodiments of the invention, groups of servers in origin servers 440-442 are each located on separate shared network segments. In other embodiments, a VLAN is used to connect with origin servers 440-442. It will be understood that many different configurations for coupling the servers to distributor 505 may be performed without departing from the spirit or scope of this invention.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. An apparatus for distributing flows of packets in a network having a plurality of network devices and a plurality of traffic managers, comprising:
   a receiving interface for receiving a flow of packets to one of the plurality of network devices; and
   a forwarding component that forwards each received packet to a determined traffic manager, wherein the forwarding component determines the traffic manager based on whether at least one address that is included with a received packet is also associated with a set of addresses, and wherein if the packet includes a source address that is associated with the set of addresses, using a destination address of the packet to determine the traffic manager and
   wherein the forwarding component forwards the packet to the determined traffic manager using the source address of the packet if it includes the destination address that is associated with another set of addresses.

2. The apparatus of claim 1, wherein the determined traffic manager is persistent for each packet in at least one flow of packets.

3. The apparatus of claim 1, wherein using the source address of the packet includes hashing it to obtain a value that is then used to distribute the packet to a particular traffic manager.

4. The apparatus of claim 1, wherein the forwarding component enables the packet to be routed to a destination if at least one of the source address is not associated with the set of addresses or the destination address is not associated with the set of addresses.

5. The apparatus of claim 1, wherein each address includes at least one of a media access control (MAC) address, a virtual local area network (VLAN) identifier, a transmission control protocol (TCP) port, a user datagram protocol (UDP) port, an internet protocol (IP) address, physical port identifier, or a physical port.

6. The apparatus of claim 1, wherein if the packet is received from one of the plurality of traffic managers, a first address included in the packet is replaced with a second address.

7. The apparatus of claim 1, wherein the apparatus is further arranged to operate as at least one of a switch chassis, router, proxy, firewall, load balancer, or Network Address Translator (NAT).

8. An apparatus for distributing flows of packets in a network having a plurality of network devices and a plurality of traffic managers, comprising:
   a receiving interface for receiving a flow of packets to one of the plurality of network devices; and
   a forwarding component that forwards each received packet to a determined traffic manager, wherein the forwarding component determines the traffic manager based on whether at least one address that is included with a received packet is also associated with a set of addresses, and wherein if the packet includes a destination address that is associated with the set of addresses, forwarding the packet to the traffic manager using a source address of the packet, and
   wherein the forwarding component forwards the packet to the determined traffic manager using the destination address of the packet if it includes the source address that is associated with the set of addresses.

9. The apparatus of claim 8, wherein the determined traffic manager is persistent for each packet in at least one flow of packets.

10. The apparatus of claim 8, wherein if the packet is received from one of the plurality of traffic managers, a first address included in the packet is replaced with a second address.

11. A system for distributing flows of packets over a network, comprising:
    a plurality of servers that are arranged to provide access to a resource over the network;

a plurality of traffic managers that are configured to direct at least one flow of packets to at least one of the plurality of servers; and at least one distributor that is arranged to receive the flow of packets and forward the flow to a determined traffic manager, wherein if the packet includes a source address that is associated with a set of addresses, the distributor is configured to use a destination address of the packet to determine the one of the plurality of traffic managers to forward the packet to and wherein the distributor is further arranged to use a source address of the packet to determine the one of the plurality of traffic managers to forward the packet to if the packet includes a destination address that is associated with another set of addresses.

12. The system of claim 11, wherein the determined one of the plurality of traffic managers is persistent for each packet in at least one flow of packets between two network devices.

13. The system of claim 11, wherein if the packet is received from one of the plurality of traffic managers, a first address included in the packet is replaced with a second address.

14. The system of claim 11, further comprising a virtual local area network (VLAN) coupled to at least a portion of the plurality of traffic managers, wherein the packet is forwarded by placing an identifier in front of a media access control header and sending the packet to the VLAN switch.

15. A system for distributing flows of packets over a network, comprising:

a plurality of servers that are arranged to provide access to a resource over the network;

a plurality of traffic managers that are configured to direct at least one flow of packets to at least one of the plurality of servers; and at least one distributor that is arranged to receive the flow of packets and forward the flow to a determined traffic manager, wherein if the packet includes a destination address that is associated with a set of addresses, the distributor is configured to use a source address of the packet to determine the one of the plurality of traffic managers to forward the packet to, and wherein if the packet includes a source address that is associated with the set of addresses, the distributor is configured to use the destination address of the packet to determine the one of the plurality of traffic managers to forward the packet to.

16. The system of claim 15, wherein the determined one of the plurality of traffic managers is persistent for each packet in at least one flow of packets between two network devices.

17. The system of claim 15, wherein if the packet is received from one of the plurality of traffic managers, a first address included in the packet is replaced with a second address.

18. The system of claim 15, further comprising a virtual local area network (VLAN) coupled to at least a portion of the plurality of traffic managers, wherein the packet is forwarded by placing an identifier in front of a media access control header and sending the packet to the VLAN switch.

19. A method for distributing flows of packets over a network having a plurality of network devices and a plurality of traffic managers, comprising:

receiving a flow of packets to at least one of the plurality of network devices;

for each packet in the flow with a source address associated with a set of addresses, forwarding that packet to one of the plurality of traffic managers that is selected based at least in part on a destination address of the packet, and for each packet in the flow with the destination address associated with the set of addresses, forwarding that packet to said one of the plurality of traffic managers that is selected based at least in part on a source address of the packet.

20. The method of claim 19, wherein the selected one of the plurality of traffic managers is persistent for each packet in at least one flow of packets between two network devices.

21. The method of claim 19, wherein if the packet is received from one of the plurality of traffic managers, a first address included in the packet is replaced with a second address.

22. A non-transitory computer readable storage media that includes components that embody computer executable instructions that when executed on a computing device enables the distribution of a flow of packets over a network having a plurality of network devices and a plurality of traffic managers, comprising:

a first component arranged for enabling the receipt of a flow of packets to at least one of the plurality of network devices;

a second component arranged for enabling each packet in the flow with a source address associated with a set of addresses to be forwarded to one of the plurality of traffic managers that is selected based at least in part on a destination address of the packet, and a third component arranged for enabling each packet in the flow with the destination address associated with the set of addresses to be forwarded to said one of the plurality of traffic managers that is selected based at least in part on a source address of the packet.

23. A non-transitory computer readable storage media of claim 22, wherein the selected one of the plurality of traffic managers is persistent for each packet in at least one flow of packets between two network devices.

24. A non-transitory computer readable storage media of claim 22, wherein if the packet is received from one of the plurality of traffic managers, a first address included in the packet is replaced with a second address.

* * * * *

UNITED STATES PATENT AND TRADEMARK OFFICE
CERTIFICATE OF CORRECTION

| | | |
|---|---|---|
| PATENT NO. | : 7,697,427 B2 | Page 1 of 1 |
| APPLICATION NO. | : 11/469843 | |
| DATED | : April 13, 2010 | |
| INVENTOR(S) | : Carlton G. Amdahl et al. | |

It is certified that error appears in the above-identified patent and that said Letters Patent is hereby corrected as shown below:

On the title page, item (74), in column 2, under "Attorney", line 1, delete "Dary" and insert -- Darby --, therefor.

On Sheet 7 of 13, in FIG. 7, Reference Numeral 730, line 2, after "based on" delete "on".

In column 3, line 10, delete "fall" and insert -- full --, therefor.

In column 12, line 53, after "420" insert -- . --.

In column 17, line 29, after "possible" insert -- . --.

In column 17, line 47, delete "12.228.54.3." and insert -- 12.228.54.3 --, therefor.

In column 17, line 51, delete "168.33.20.180" and insert -- 168.33.20.1:80 --, therefor.

In column 17, line 56, delete "168.33.20.180." and insert -- 168.33.20.1:80. --, therefor.

In column 17, line 65, delete "168.33.30.180," and insert -- 168.33.30.1:80, --, therefor.

In column 18, line 6, delete "168.33.30.180," and insert -- 168.33.30.1:80, --, therefor.

Signed and Sealed this

Nineteenth Day of October, 2010

David J. Kappos
*Director of the United States Patent and Trademark Office*

(12) INTER PARTES REEXAMINATION CERTIFICATE (710th)
United States Patent
Amdahl et al.

(10) Number: US 7,697,427 C1
(45) Certificate Issued: *Oct. 23, 2013

(54) METHOD AND SYSTEM FOR SCALING NETWORK TRAFFIC MANAGERS

(75) Inventors: Carlton G. Amdahl, Fremont, CA (US); Robert George Gilde, Issaquah, WA (US); David D. Schmitt, Seattle, WA (US); Paul Szabo, Seattle, WA (US); Richard R. Masters, Seattle, WA (US)

(73) Assignee: F5 Networks, Inc., Seattle, WA (US)

Reexamination Request:
No. 95/001,509, Dec. 13, 2010

Reexamination Certificate for:
Patent No.: 7,697,427
Issued: Apr. 13, 2010
Appl. No.: 11/469,843
Filed: Sep. 1, 2006

Certificate of Correction issued Oct. 19, 2010

( * ) Notice: This patent is subject to a terminal disclaimer.

Related U.S. Application Data

(63) Continuation of application No. 10/119,433, filed on Apr. 9, 2002, now Pat. No. 7,102,996.

(60) Provisional application No. 60/293,466, filed on May 24, 2001.

(51) Int. Cl.
*H04J 1/16* (2006.01)
*H04J 3/14* (2006.01)
*H04L 12/56* (2011.01)

(52) U.S. Cl.
CPC .................................... *H04L 47/10* (2013.01)
USPC ........................................ 370/230; 370/401

(58) Field of Classification Search
USPC ........................................................ 370/230
See application file for complete search history.

(56) References Cited

To view the complete listing of prior art documents cited during the proceeding for Reexamination Control Number 95/001,509, please refer to the USPTO's public Patent Application Information Retrieval (PAIR) system under the Display References tab.

*Primary Examiner* — Dennis Bonshock

(57) ABSTRACT

A system for distributing network traffic to multiple traffic management devices. A distributor receives each packet from a network and may act as a layer 2 switch, a router, or distribute the packet to one of a group of traffic management devices. The distributor may receive packets from servers that the traffic management devices are managing communications to. When distributing packets to traffic management devices, information such as source and destination addresses may be used to determine which traffic management device each packet should be sent to. The distributor causes packets that are part of a flow to be delivered to the same traffic management device. Many configurations are possible for connecting the distributor to the traffic management devices, including connecting each traffic management device to a physical or virtual port on the distributor, connecting the traffic management devices to the distributor using a virtual local area network, and connecting the traffic management devices to a layer 2 switch.

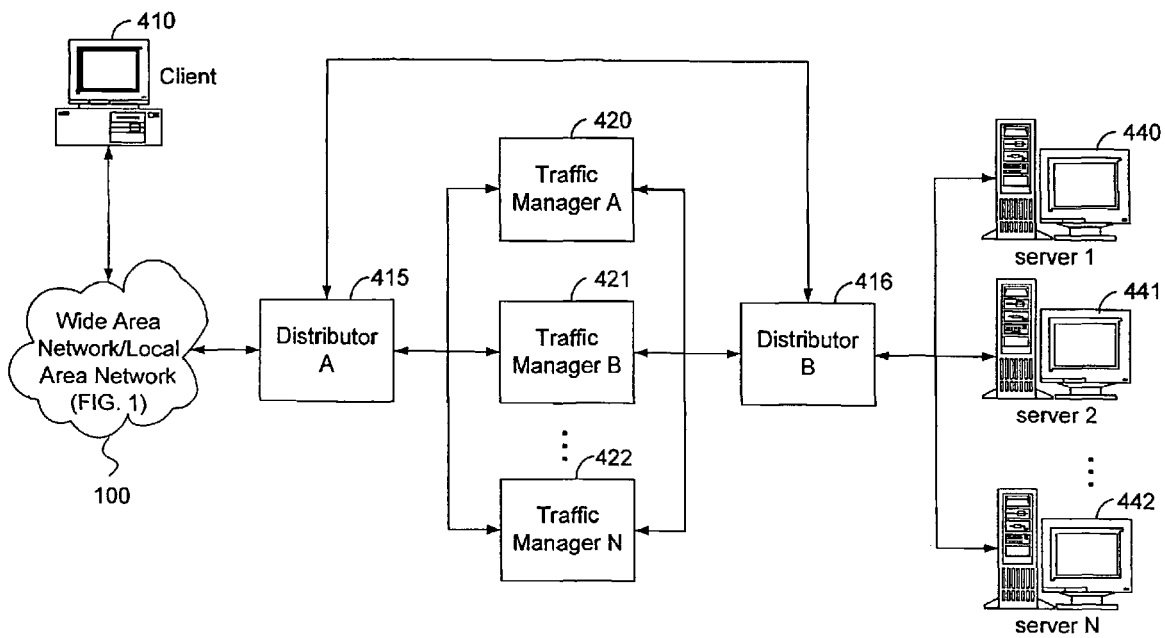

US 7,697,427 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8, 11, 15, 19 and 22 are determined to be patentable as amended.

Claims 2, 3, 5, 7, 9, 12, 16, 20 and 23, dependent on an amended claim, are determined to be patentable.

Claims 4, 6, 10, 13, 14, 17, 18, 21 and 24 were not reexamined.

1. An apparatus for distributing flows of packets in a network having a plurality of network devices and a plurality of traffic managers, comprising:
   a receiving interface for receiving a flow of packets to one of the plurality of network devices; and
   a forwarding component that forwards each received packet to a determined traffic manager, wherein the forwarding component determines the traffic manager based on whether at least one address that is included with a received packet is also associated with a set of addresses, and wherein based just on if the packet includes a source address that is associated with the set of addresses, using just a destination address of the packet to determine the traffic manager and
   [wherein] otherwise the forwarding component forwards the packet to the determined traffic manager using just the source address of the packet based just on if it includes the destination address that is associated with another set of addresses.

8. An apparatus for distributing flows of packets in a network having a plurality of network devices and a plurality of traffic managers, comprising:
   a receiving interface for receiving a flow of packets to one of the plurality of network devices; and
   a forwarding component that forwards each received packet to a determined traffic manager, wherein the forwarding component determines the traffic manager based on whether at least one address that is included with a received packet is also associated with a set of addresses, and
   wherein based just on if the packet includes a destination address that is associated with the set of addresses, forwarding the packet to the traffic manager using just a source address of the packet, and [wherein] otherwise the forwarding component forwards the packet to the determined traffic manager using just the destination address of the packet based just on if it includes the source address that is associated with the set of addresses.

11. A system for distributing flows of packets over a network, comprising:
   a plurality of servers that are arranged to provide access to a resource over the network;
   a plurality of traffic managers that are configured to direct at least one flow of packets to at least one of the plurality of servers; and
   at least one distributor that is arranged to receive the flow of packets and forward the flow to a determined traffic manager, wherein based just on if the packet includes a source address that is associated with a set of addresses, the distributor is configured just to use a destination address of the packet to determine the one of the plurality of traffic managers to forward the packet to and
   [wherein] otherwise the distributor is further arranged just to use a source address of the packet to determine the one of the plurality of traffic managers to forward the packet to based just on if the packet includes a destination address that is associated with another set of addresses.

15. A system for distributing flows of packets over a network, comprising:
   a plurality of servers that are arranged to provide access to a resource over the network;
   a plurality of traffic managers that are configured to direct at least one flow of packets to at least one of the plurality of servers; and
   at least one distributor that is arranged to receive the flow of packets and forward the flow to a determined traffic manager, wherein based just on if the packet includes a destination address that is associated with a set of addresses, the distributor is configured just to use a source address of the packet to determine the one of the plurality of traffic managers to forward the packet to, and
   [wherein] otherwise based just on if the packet includes a source address that is associated with the set of addresses, the distributor is configured just to use the destination address of the packet to determine the one of the plurality of traffic managers to forward the packet to.

19. A method for distributing flows of packets over a network having a plurality of network devices and a plurality of traffic managers, comprising:
   receiving a flow of packets to at least one of the plurality of network devices;
   for each packet in the flow with a source address associated with a set of addresses, forwarding that packet to one of the plurality of traffic managers that is selected based [at least in part] just on a destination address of the packet, and
   otherwise for each packet in the flow with the destination address associated with the set of addresses, forwarding that packet to said one of the plurality of traffic managers that is selected based [at least in part] just on a source address of the packet.

22. A non-transitory computer readable storage media that includes components that embody computer executable instructions that when executed on a computing device enables the distribution of a flow of packets over a network having a plurality of network devices and a plurality of traffic managers, comprising:
   a first component arranged for enabling the receipt of a flow of packets to at least one of the plurality of network devices;
   a second component arranged for enabling each packet in the flow [with] just based on having a source address associated with a set of addresses to be forwarded to one of the plurality of traffic managers that is selected based [at least in part] just on a destination address of the packet, and
   [a third component] arranged for otherwise enabling each packet in the flow [with] just based on having the destination address associated with the set of addresses to be forwarded to said one of the plurality of traffic managers that is selected based [at least in part] *just* on a source address of the packet.

\* \* \* \* \*